(12) United States Patent
Son (10) Patent No.: US 9,638,542 B2
(45) Date of Patent: May 2, 2017

(54) METHOD AND SYSTEM OF ROUTE SCHEDULING AND PRESENTING ROUTE-BASED FUEL INFORMATION

(71) Applicant: Alpine Electronics, Inc., Tokyo (JP)

(72) Inventor: Hyunji Son, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 41 days.

(21) Appl. No.: 14/724,479

(22) Filed: May 28, 2015

(65) Prior Publication Data

US 2016/0349075 A1 Dec. 1, 2016

(51) Int. Cl.
| | |
|---|---|
| G06F 19/00 | (2011.01) |
| G01C 21/36 | (2006.01) |
| G01C 21/34 | (2006.01) |
| G01S 19/13 | (2010.01) |

(52) U.S. Cl.
CPC ..... *G01C 21/3697* (2013.01); *G01C 21/3469* (2013.01); *G01S 19/13* (2013.01)

(58) Field of Classification Search
CPC .. G01C 21/3697; G01C 21/3469; G01S 19/13
See application file for complete search history.

(56) References Cited

U.S. PATENT DOCUMENTS

| | | |
|---|---|---|
| 6,591,185 B1 | 7/2003 | Polidi et al. |
| 7,999,664 B2 | 8/2011 | Barajas |
| 2002/0152115 A1* | 10/2002 | Morita ............... G06Q 30/02 705/13 |
| 2005/0075119 A1* | 4/2005 | Sheha ............... G01C 21/26 455/456.6 |
| 2005/0228553 A1* | 10/2005 | Tryon ............... B60K 6/46 701/22 |
| 2007/0174004 A1* | 7/2007 | Tenzer ............... G06Q 10/04 701/123 |
| 2009/0319110 A1* | 12/2009 | Tani ............... B60K 6/48 701/22 |

(Continued)

FOREIGN PATENT DOCUMENTS

| | | |
|---|---|---|
| JP | H10-260050 | 9/1998 |
| JP | 2004-219270 | 8/2004 |

(Continued)

*Primary Examiner* — Ian Jen
(74) *Attorney, Agent, or Firm* — Muramatsu & Associates (57) ABSTRACT

A system of route scheduling for a vehicle presents fuel information for a vehicle. The system receives vehicle related drive information and fuel information from the vehicle via a vehicle interface, including fuel tank capacity, a current fuel level, and fuel economy, calculates routes to points from a current vehicle position based on the drive related information of sensors, estimates first fuel amounts for reaching the points based on the calculated routes and the fuel economy, selects fuel stations within a predetermined range of the calculated routes based on their locations, estimates second fuel amounts for reaching the fuel stations based on their locations, the fuel economy and the current vehicle position, obtains fuel prices of the fuel stations from a network, and instructs a screen to display the fuel prices, the point information, the locations of the fuel stations, the fuel tank capacity and the current fuel level along with a segment.

20 Claims, 10 Drawing Sheets

(56) References Cited

U.S. PATENT DOCUMENTS

| | | | |
|---|---|---|---|
| 2010/0049397 A1* | 2/2010 | Liu | G08G 1/096833 701/31.4 |
| 2010/0198508 A1* | 8/2010 | Tang | G01C 21/3469 701/414 |
| 2011/0288765 A1* | 11/2011 | Conway | G01C 21/3469 701/533 |
| 2012/0226435 A1* | 9/2012 | Yuasa | G01C 21/3469 701/123 |
| 2013/0095157 A1* | 4/2013 | Jeong | A61K 8/11 424/401 |
| 2013/0226443 A1 | 8/2013 | Scofield et al. | |
| 2013/0282272 A1* | 10/2013 | Kluge | G01C 21/3469 701/425 |
| 2014/0019041 A1* | 1/2014 | Kluge | G01C 21/3469 701/430 |
| 2014/0049387 A1 | 2/2014 | Brown et al. | |
| 2014/0142836 A1 | 5/2014 | Yabuta | |
| 2014/0200804 A1 | 7/2014 | Wippler | |
| 2014/0244098 A1* | 8/2014 | Ueda | G06Q 50/02 701/29.3 |
| 2015/0051829 A1* | 2/2015 | Gearhart | G01C 21/343 701/467 |
| 2015/0074013 A1* | 3/2015 | Schoonmaker | G06Q 10/08355 705/338 |
| 2015/0168172 A1* | 6/2015 | Roth | G01C 21/3476 701/123 |
| 2015/0276419 A1* | 10/2015 | Hashem | G01C 21/20 701/425 |
| 2016/0033293 A1* | 2/2016 | Nobrega | G01C 21/3415 701/423 |
| 2016/0035001 A1* | 2/2016 | Driscoll | G06Q 30/0631 705/26.7 |
| 2016/0091338 A1* | 3/2016 | Abuelsaad | G01C 21/3697 701/538 |
| 2016/0253707 A1* | 9/2016 | Momin | G06Q 30/0266 |

FOREIGN PATENT DOCUMENTS

| | | |
|---|---|---|
| JP | 2006-133068 | 5/2006 |
| JP | 2010-32363 | 2/2010 |
| JP | 2011-38970 | 2/2011 |
| JP | 2014-32139 | 2/2014 |

* cited by examiner

METHOD AND SYSTEM OF ROUTE SCHEDULING AND PRESENTING ROUTE-BASED FUEL INFORMATION

BACKGROUND

1. Field

The present disclosure relates to a method and system of presenting fuel information for a vehicle. More specifically, embodiments in the present disclosure relate to a method and system of presenting fuel information with route scheduling information for the vehicle to a driver in a user-friendly manner, in order to assist the driver to determine efficient routes with timely fueling for the vehicle.

2. Description of the Related Art

In a vehicle, a conventional method to present a fuel level of the vehicle to a driver is indicating the fuel level in units of liquid volume, such as gallons or liters. This quantitative indication of fuel level may not be readily understood by some drivers who wish to know when the vehicle needs to be fueled next, based on his/her plan addressing his/her daily real-life concerns. For example, when the fuel-level indicator points "Low", the driver may check a fuel range of the vehicle that displays a drivable distance the vehicle can travel with its remaining fuel in miles (e.g. "X miles"). The driver then needs to visualize how far the drivable distance "X miles" is in comparison with driving distances to destinations in the near future. Here, the driver may not resolve concerns, such as whether the vehicle is able to reach next destination without getting off a freeway on route to fuel gas, or whether fueling is necessary before next appointment. The driver needs to coordinate events which require driving and fueling timing, location and cost, suitable to the driver's own schedule. Merely showing remaining amount of the fuel in rate as the fuel level may not be sufficient. Therefore, more intuitive indication of the fuel level based on a schedule and/or a life style of the driver that may help the driver in deciding timely fueling the vehicle and controlling a budget of the driver, etc., may be greatly appreciated.

Accordingly, there is a need to provide a method and system of presenting fuel information for a vehicle with route scheduling information for the vehicle to a driver in a user-friendly manner, so that the driver is able to determine efficient routes with timely fueling for the vehicle.

SUMMARY

In one aspect, a method displaying fuel information for a vehicle is provided. This method includes obtaining fuel tank capacity information of the vehicle, current fuel level information of the vehicle, fuel economy information of the vehicle, and point information of one or more points, each point information of each point including location information, calculating routes to the one or more points based on location information of the one or more points and a current vehicle position, estimating first fuel amounts for reaching the one or more points based on the calculated routes, fuel economy information, selecting one or more fuel stations within a predetermined range of the calculated routes based on location information of the one or more fuel stations, estimating second fuel amounts for reaching the one or more fuel stations based on the obtained locations of the fuel stations, the fuel economy information and the current vehicle position, obtaining fuel price information of the one or more fuel stations from a network, and displaying the point information, the locations of the fuel stations, the fuel price information, the fuel tank capacity information and the current fuel level information along one or more segments of parameter.

In another aspect, a system of route scheduling for a vehicle which presents fuel information for the vehicle is provided. This system of route scheduling for the vehicle which presents fuel information for the vehicle includes a processor, one or more sensors which sense drive related information, a memory having a map database, a screen, and a vehicle interface which receives vehicle related drive information and fuel information from the vehicle. The fuel information from the vehicle includes fuel tank capacity information of the vehicle, current fuel level information of the vehicle, and fuel economy information of the vehicle. The processor obtains point information of one or more points, each point information of each point includes location information, calculates routes to the one or more points based on location information of the one or more points and a current vehicle position based on the drive related information of the one or more sensors, estimates first fuel amounts for reaching the one or more points based on the calculated routes and the fuel economy information, selects one or more fuel stations within a predetermined range of the calculated routes based on location information of the one or more fuel stations, estimates second fuel amounts for reaching at the one or more fuel stations based on the obtained locations of the fuel stations, the fuel economy information and the current vehicle position, obtains fuel price information of the one or more fuel stations from a network, and instructs the screen to display the fuel price information, the point information, the locations of the fuel stations, the fuel tank capacity information and the current fuel level information along with one or more segments of parameter.

In one embodiment, the selected one or more fuel stations may be the nearest one or more fuel stations from the current vehicle position. Alternatively, the processor computes a drivable distance based on the current fuel level information and the fuel economy information and the selected one or more fuel stations are the farthest one or more fuel stations within the drivable distance from the current vehicle position. In other way, the selected one or more fuel stations may have substantially lowest fuel prices within the drivable distance from the current vehicle position.

In another embodiment, the processor instructs the screen to display at least one of point information of the one or more points or fuel station information of the one or more fuel stations, allows a user to select at least one point among the one or more points and a fuel station among the one or more fuel stations, instructs the screen to display at least one of fuel price or amount of fuel to be fed at the selected fuel station if the fuel station is selected, and instructs the screen to display at least one of fuel price or amount of fuel to be fed for reaching to the selected point, if the point is selected.

In one embodiment, the processor may further compute a drivable distance based on the current fuel level information, the fuel economy information and a reference point, search a landmark within the drivable distance from a reference point by using the map database, and instruct the screen to display the reference point, the drivable distance and the landmark along with the line on the screen.

In another example, the processor may further instruct the screen to display at least one of fuel price or amount of fuel to be fed at a nearest fuel station for reaching the one or more points from the nearest fuel station.

In one embodiment, the processor may obtain the point information of the one or more points by accessing at least one of user entries, search results of Points of Interest, driving history including visited points, location information obtained from social media, near future events in a calendar of a user in the vehicle, and contexts of communications related to the user in the vehicle.

In one embodiment, the processor may instruct the screen to display logos associated with brands of the fuel stations with the locations of the fuel stations along the segment, respectively. In another embodiment, the processor may instruct the screen to display a whole or part of the segment indicating a whole or partial route corresponding to a motorway in a distinctive manner.

The above and other aspects, objects and advantages will be readily apparent from the following detailed discussion.

BRIEF DESCRIPTION OF THE DRAWINGS

FIGS. 7(a) and (b) are screen samples of presenting fuel information with route scheduling illustrating transition between screens by a tapping hand according to one embodiment.

FIGS. 8(a) and (b) are screen samples of presenting fuel information with route scheduling illustrating transition between a first screen displaying fuel station information screen and a second screen displaying a landmark reachable with a current fuel amount by a tapping hand according to one embodiment.

DETAILED DESCRIPTION OF THE PREFERRED EMBODIMENTS

Various embodiments for a method and system of presenting fuel information with route scheduling will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where the method and system of presenting fuel information with route scheduling, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventor is not entitled to antedate such disclosure by virtue of prior publications.

In general, various embodiments of the present disclosure are related to a method of presenting fuel information with route scheduling. Furthermore, the embodiments are related to a system of presenting fuel information with route scheduling. Thus, more useful fuel related information such as future point information, locations of fuel stations, fuel price, fuel tank capacity and a current fuel level can be visually presented along one or more segments on a screen to the driver in order to achieve fuel economy conscious route scheduling.

Figure 1:
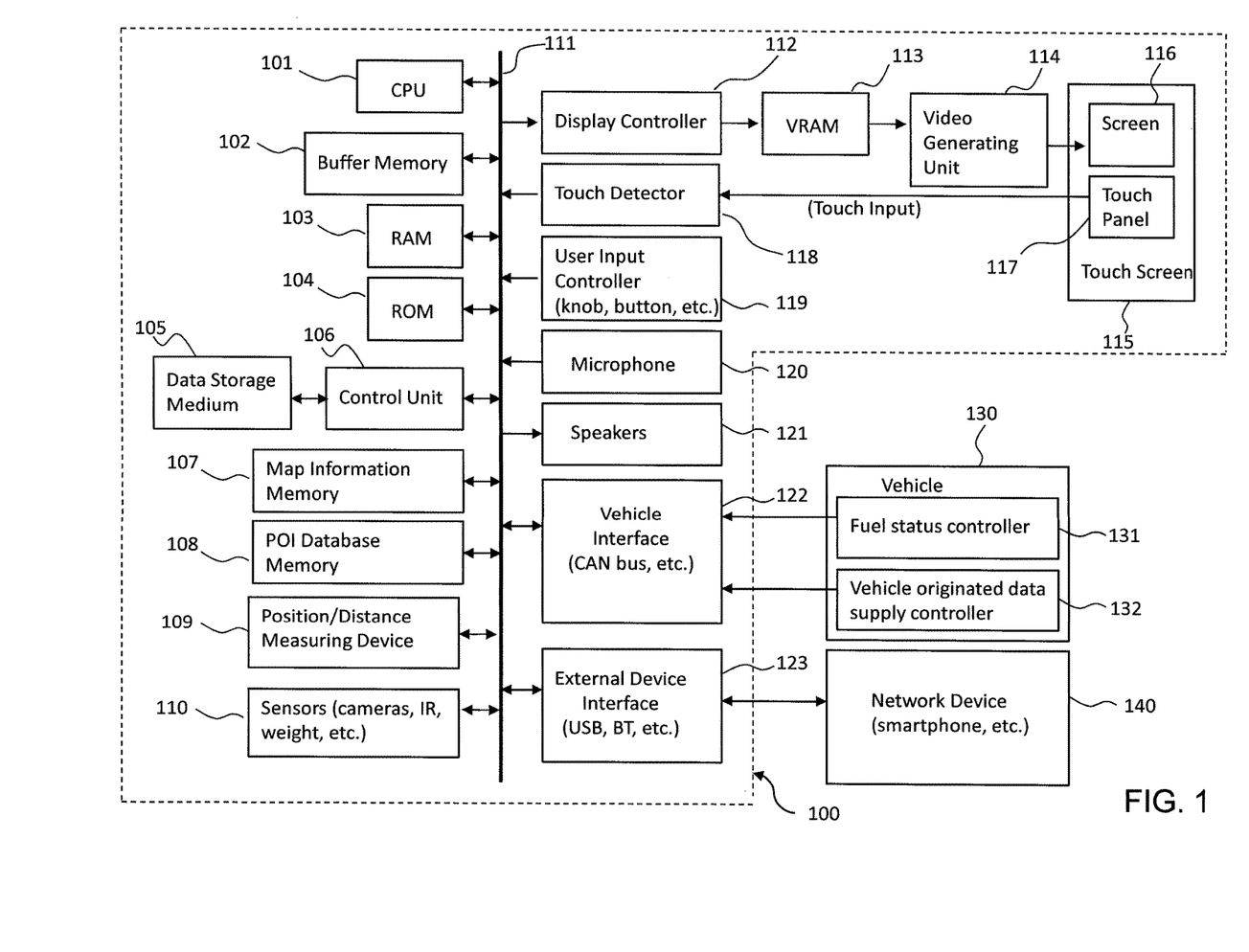
FIG. 1 is a block diagram including a navigation system presenting fuel information with route scheduling, according to one embodiment.

FIG. 1 is a block diagram of a route guidance system in a vehicle that executes a method of presenting fuel information with route scheduling according to one embodiment. Note that the block diagram in FIG. 1 is merely an example according to one embodiment for an illustration purpose and not intended to represent any one particular architectural arrangement. The various embodiments can be applied to other types of route guidance system and implemented as long as the route guidance system can accommodate the method of presenting fuel information with route scheduling. For example, the vehicle navigation system 100 includes a central processor unit (CPU) 101 for controlling an overall operation of the navigation system, a buffer memory 102 for temporally storing data such as an icon data table for efficiently displaying icons in accordance with this disclosure, a random access memory (RAM) 103 for storing a processing result such as guide route, and a read only memory (ROM) 104 for storing various control programs, such as a route search program and a map matching program necessary for navigation control as well as a fuel information processing program of this disclosure.

The vehicle navigation system 100 also includes a data storage medium 105 such as a hard disk in a hard disk drive (HDD), flash memory in a solid state drive (SSD) or USB key memory, a compact disc—read only memory (CD-ROM), a digital versatile disc (DVD) or other storage medium for storing the map data that includes various driving information for displaying fuel information of the vehicle. The vehicle navigation system 100 also includes a control unit 106 for controlling an operation for reading the information from the data storage medium 105. The vehicle navigation system 100 further includes a map information memory 107 for storing a portion of the map data relevant to ongoing operations of the vehicle navigation system 100 which is read from the data storage medium 105, a point of interest (POI) database memory 108 for storing database information such as POI information which is read out from the data storage medium 105.

The vehicle navigation system 100 also includes a position/distance measuring device 109 for measuring a present vehicle position. For example, the position measuring device 109 has a vehicle speed sensor for detecting a moving distance, a gyroscope for detecting a moving direction, a microprocessor for calculating a position, a global positioning system (GPS) for receiving and analyzing GPS signals, etc. Furthermore, the vehicle navigation system 100 may integrate or connect to sensors 110, such as cameras, infrared sensors, weight sensors, etc. The components mentioned above are connected via a bus system 111.

The vehicle navigation system 100 accommodates a plurality of means for receiving user inputs. For example, the navigation system 100 may include a touch detector 118 for detecting a touch or press input of a user on a touch panel 117 of a touch screen 115, which allows the user to enter intuitive look and feel input. Gestures of the user may be also detected and received by one or more sensors 110, such as cameras. Alternatively, as seen in a traditional vehicle entertainment system, any user input controller 119 such as knobs and buttons may be included in the navigation system 100. To accommodate hands-free input operation to avoid driver distraction, it may be appropriate to use voice commands as user inputs for the navigation system 100. In order to receive such voice commands, microphone 120 for receiving speech input may be included. Once a voice command is received at the microphone 120, the voice command is sent to a speech engine to be matched with any speech pattern associated with navigation related vocabulary in a speech database and the matched speech pattern is interpreted as a voice command input from the user. Although listed input means may be an example for selecting menus, executing selected functions etc., the navigation system may include various other input methods, to achieve the same and similar operations.

The vehicle navigation system 100 may also include a plurality of means to output an interactive result of user input operations. For example, the navigation system 100 may include a display controller 112 for generating map images, such as map guide images, arrow guide images, icon images of POIs, possible alerts, as well as menu images related to the map information and the generated map image is stored in a video RAM (VRAM) 113. The map image stored in the VRAM 113 is sent to a video generating unit 114 where the map image is converted to an appropriate format to be displayed on a screen 116 of a touch screen 115. Upon the receipt of video data, the screen 116 displays the map. Alternatively, to keep eyes of a driving user on a road rather than prompting the driving user to look in to the screen, the interactive output may be presented to the driving user as audio feedback via one or more speakers 121.

Furthermore, the navigation system 100 may include a vehicle interface 122. Using the vehicle interface 122, the navigation system 100 may communicate with devices inside a vehicle 130, where the navigation system 100 is installed or placed. For example, the vehicle interface 122 may be used for retrieving vehicle's fuel level information of the vehicle 130 from a fuel status controller 131 of the vehicle 130, vehicle attribute information from a vehicle originated data supply controller 132. The vehicle attribute information includes a vehicle type such as a hybrid car, an electric car, a fuel cell car, as well as a vehicle model name, and a typical mileage, etc. The vehicle originated data supply controller 132 may also able to provide current driving information to the vehicle interface 122 by including a vehicle speed sensor for detecting a moving distance, a gyroscope for detecting moving direction, a microprocessor 15, for calculating a position, a global positioning system (GPS) for receiving and analyzing GPS signals, etc. The vehicle interface 122 may be a controller area network (CAN) bus, but not limited to it. Any vehicle internal bus which is able to communicate signals of fuel information and driving information can be adequate as the vehicle interface 122, in order to compute fuel economy information which enables the navigation system 100 to provide a drivable distance with fuel remaining in a tank, a driving distance reachable with fuel of a full tank, a driving distance and fuel amount reaching to a particular location such as a Point of Interest (POI), a fuel station, etc., in this method and system of presenting fuel information with route scheduling.

The bus system 111 may include one or more busses connected to each other in the navigation system 100 through various adapters, controllers, connectors, etc. and the devices and units mentioned the above were coupled to each other via the bus system.

The CPU 101 controls an overall operation of the navigation system. This overall operation includes estimating a fuel status of the vehicle 130 from the fuel level information, vehicle attribute information, and the current driving information received via the vehicle interface 122, receiving schedule and location related information of a user, typically a driver, such as a calendar, a Social Networking Service (SNS) related information and user's frequently accessed information from internet through a networking device 140 such as a smartphone via an external device interface 123 which can be wired connection such as a universal serial bus (USB) or wireless connection such as Bluetooth (BT), and accessing a map database based on predicted waypoints and destinations in near future based on the schedule and location related information of the user. The networking device 140 may also retrieve traffic condition information from a remote server to incorporate traffic condition such as traffic jam, accident, etc, related to the route on which the vehicle is travelling to assist the route scheduling.

For example, the data storage medium 105 stores the map database in which the map data is configured in a layered structure where each layer stores the links, nodes and other information. Please note that this is merely an example, and it is possible to have the similar structured map database remotely and accessible via network. In such a layered structure, the higher layer represents only high class roads, for example, interstate highway, freeway, etc. with road links (road segments) of relatively large length and covers the wider area. In contrast, the lower layer represents low class roads, i.e., residential roads, etc. with many road links (road segments) of relatively short length, POI icons, building foot prints, etc., in addition to that represented by the higher layers. For each layer, traffic regulation information for vehicles, such as a speed limit and a dimension limit can be added for each link so that the navigation system is able to provide route guidance and alerts using the traffic regulation information for the vehicles. The navigation system 100 is able to recognize high class roads in the higher layer as noted above, thus the system is able to detect and to display where the vehicle is not able to stop for fueling.

Figure 2:
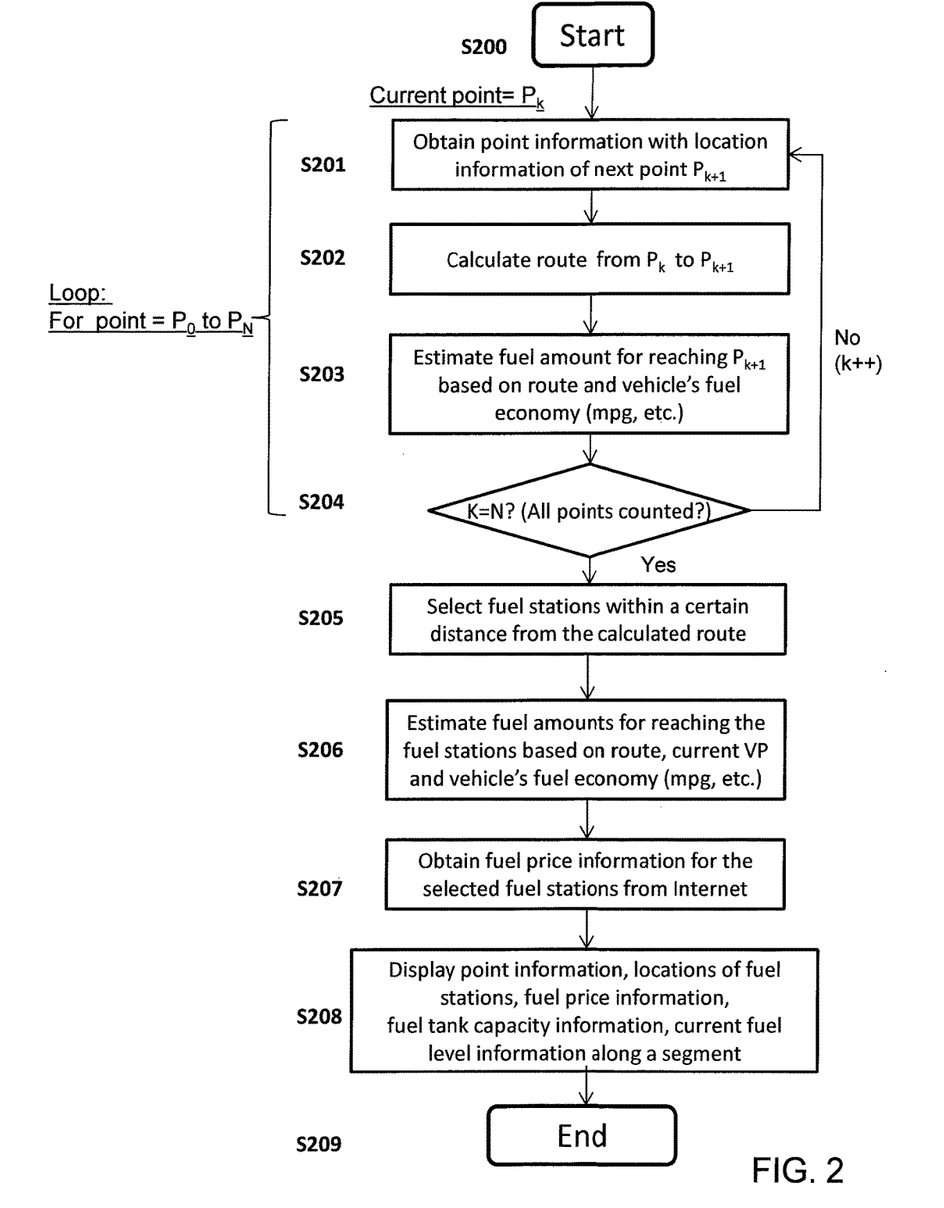
FIG. 2 is a flowchart of presenting fuel information with route scheduling, according to one embodiment.

When a user enters a vehicle 130 and starts an engine which also activates the navigation system 100 (FIG. 2, S200), the navigation system 100 tries to determine future points including waypoints and destinations from the received schedule and location related information of the user, typically a driver, such as a calendar, an Social Networking Service (SNS) related information and user's frequently accessed information from internet through the network device 140 such as a smartphone via an external device interface 123. Once the future points are determined, the navigation system 100 obtains point information with location information of next point (FIG. 2, S201), calculates routes from a current point to the next point (FIG. 2, S202), estimates fuel amount for reaching the next point based on the calculated routes and fuel economy of the vehicle for such points within a certain time range or drivable distance range (FIG. 2, S203), and repeats this sequence until all points are considered (FIG. 2, S204). The fuel economy may vary largely depending on the type of vehicle such as a large SUV (Sports Utility Vehicle), a small car, or a hybrid car, etc., thus, the vehicle attribute information from the vehicle originated data supply controller 132 in FIG. 1 may be used to determine or estimate the fuel economy. Further, within the context of this disclosure, if the vehicle is an electric car, the fuel is electric charge, and if the vehicle is a fuel cell car, the fuel is typically liquid or compressed hydrogen.

Once all the routes are calculated and fuel amount estimates for the points are obtained, the navigation system 100 searches fuel stations along or in proximity of the calculated route by predetermined criteria, and selects a predetermined number of fuel stations (FIG. 2, S205). The predetermined criteria will be explained with more examples in details later. Please note that the fuel station in this disclosure is typically a gas station, however, in the case where the vehicle is an electric vehicle or a fuel cell vehicle, the fuel station will be a station that is able to charge the batteries of the electric vehicle or a station that is able to fill the liquid hydrogen in the fuel cell vehicle, respectively.

Once the fuel stations are selected, the navigation system 100 estimates fuel amount for reaching the selected fuel stations based on the calculated routes and fuel economy of the vehicle (FIG. 2, S206). For the selected fuel stations, the navigation system 100 receives current fuel price information (FIG. 2, S207), such as a price per gallon for each grade, typically from internet, but any other method is acceptable as long as it is able to provide relatively recent update or good prediction of the fuel price information for fueling. If obtaining the fuel price information is successful, the navigation system 100 displays the obtained information such as point information, locations of fuel stations, fuel price information, fuel tank capacity information, current fuel level information on the screen 116, by controlling the display controller 112 (FIG. 2, S208). Please note that these pieces of information are displayed along one or more segments of parameters such as a one representing a fuel amount, a time or distance sequence of predicted points and events based on the received schedule and location related information of the user.

Figure 3:
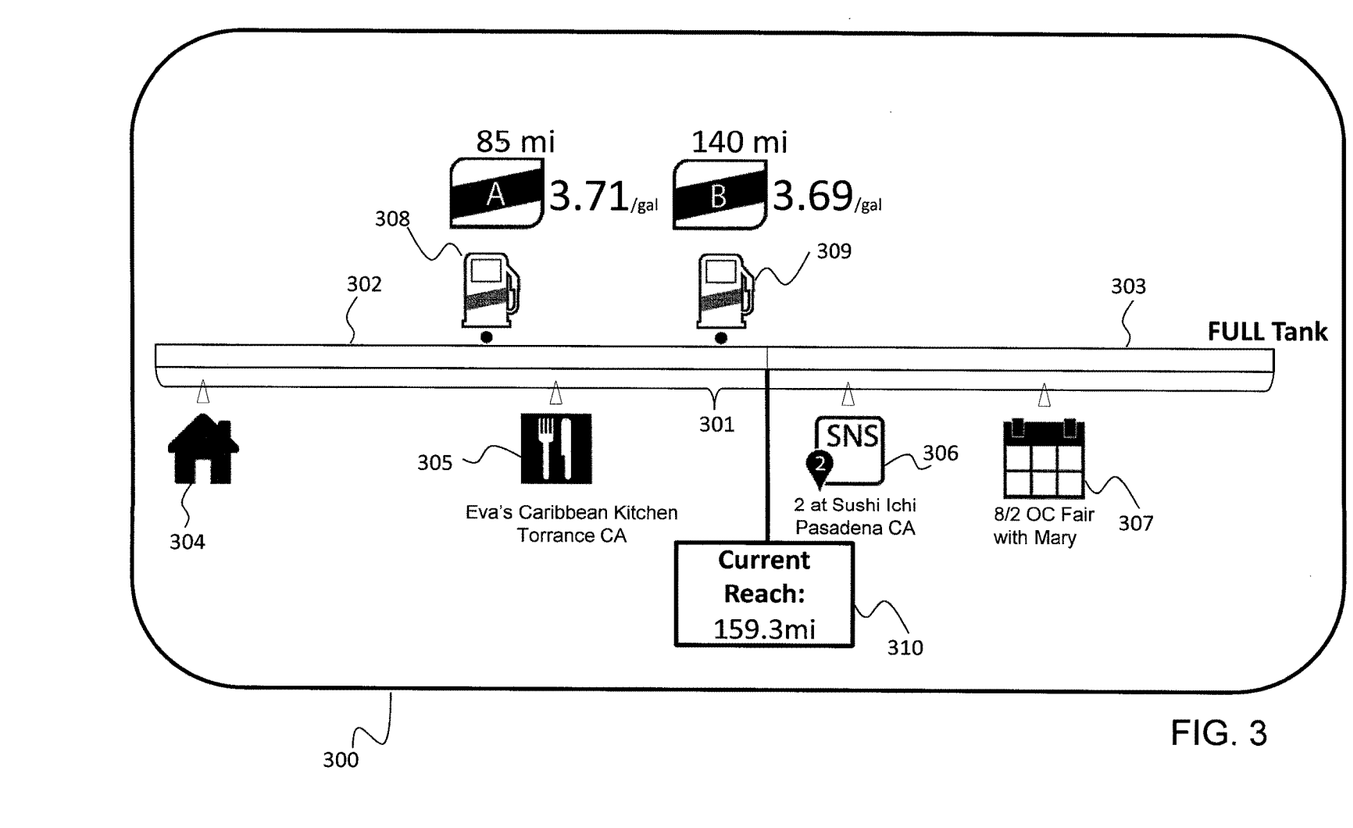
FIG. 3 is a screen sample of presenting fuel information with route scheduling according to an embodiment of the disclosure.

FIG. 3 shows a screen example illustrating a method and system of presenting fuel information with route scheduling information for the vehicle to a driver regarding one embodiment. For example, in FIG. 3, the touch screen 300 is displaying a first segment 301 representing full tank capacity information and a full drivable distance from a current vehicle position if a tank is full. The first segment 301 includes a second segment 302 representing a current fuel amount and a current drivable distance with the current fuel amount from the current vehicle position considering the route scheduling information. The first segment 301 further includes a third segment 303 representing a difference between the current fuel amount and the full tank amount as well as a driving distance not drivable by the current fuel amount but drivable if the tank is full from the current vehicle position, considering the route scheduling information.

For example, if a current vehicle position is not far from home, a house icon 304 indicating a distance from the current vehicle position and the location of the home can be placed on the second segment 302 based on a distance between the current vehicle position and the location of the house. When the driver enters a restaurant as a point of interest (POI) which is estimated to consume a fuel amount to reach from the current vehicle position less than the current fuel amount, the screen 300 also displays a restaurant icon 305 indicating the restaurant on the second segment 302 based on the drivable distance and the estimated fuel amount to be consumed to reach the restaurant. In this way, any POI search result may be included in consideration of fuel planning. Alternatively, a mere address entry or a possible entry from a list in the driver's address book, either in the navigation system, in the external device connected to the navigation system or in a cloud resource, may be used as the point.

Future driving plans include routes which can be calculated by past average daily driving distance per day, any driving plan based on a calendar, estimated hangout with acquaintance on a social networking service (SNS) and an implicit routine driving pattern covering points, such as home, work, school, supermarkets, shopping malls, etc., at certain time and day from a driving history obtained on the vehicle or a location history in the external device. For example, a plan of going to a restaurant by a number of acquaintances according to an event of an SNS can be indicated by an SNS icon 306. Since a fuel amount to reach the location of the restaurant is beyond a drivable distance of the current fuel amount 310, the SNS icon 306 may be displayed on the third segment 303. Also, when a schedule obtained from a calendar indicates that there is a plan of going to an event in a few days after reaching the drivable distance with the current fuel amount, the screen 300 also displays an event icon 307 placed on the third segment 303 based on estimated driving distance and estimated fuel amount to be consumed by arriving at the event.

The driver may also wish to know locations of fuel stations before the vehicle completely consumes the fuel. Thus, fuel stations 308 and 309 within the drivable distance along the calculated routes based on the current fuel amount may be selected to be displayed on the screen 300 based on any criteria, together with fuel station information, such as distances from the current vehicle position to the fuel station, logos representing brands of fuel, prices per amount, etc. Thus, the driver is able to choose a fuel station the driver intends to stop based on the obtained fuel station information.

Figure 4:
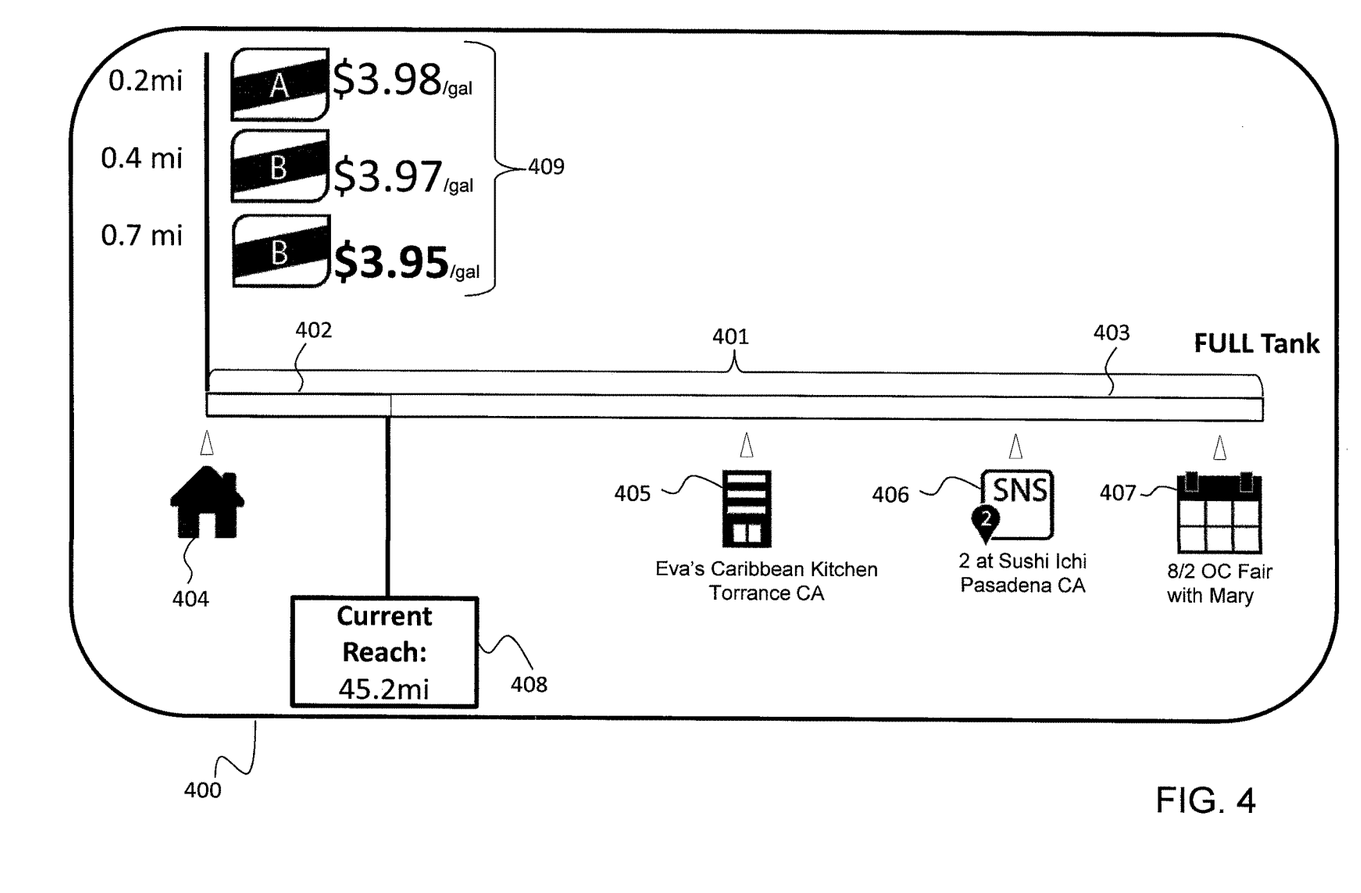
FIG. 4 is another screen sample of presenting fuel information with route scheduling according to another embodiment of the disclosure.

In another embodiment, as illustrated in FIG. 4, the screen 400 may indicate nearest fuel stations and pieces of fuel station information associated with the nearest fuel stations. The touch screen 400 is displaying a first segment 401 representing full tank capacity information and a driving distance from a current vehicle position if a tank is full.

The first segment 401 includes a second segment 402 representing a current fuel amount and a reachable distance with the current fuel amount from the current vehicle position and a third segment 403 representing a difference between the current fuel amount and the full tank amount as well as driving distances not reachable by the current fuel amount but reachable if the tank is full from the current vehicle position. For example, if a current vehicle position is home, a house icon 404 indicating the location of the home can be placed on a left end of the second segment 402.

When a POI entry by a driver, SNS information and calendar information of the driver are available, a POI icon 405, an SNS icon 406 and a calendar icon 407 are placed on the first segment 401 based on the driving distance and the estimated fuel amount to reach the restaurant, future driving plans estimated by past average daily driving distance per day, any driving plan based on a calendar, estimated hangout with acquaintance on a social networking service (SNS) and an implicit routine driving pattern covering points, such as home, work, school, supermarkets, shopping malls, etc., at certain time and day from a driving history obtained on the vehicle or a location history in the external device.

If the estimated results show that the POI icon 405, the SNS icon 406, and the calendar icon 407 are located in the third segment 403 beyond the drivable distance reachable with the current fuel amount 408, fueling may be set as the first priority and nearest predetermined number of fuel stations 409 within the current drivable distance, i.e., the second segment 402, are displayed. In FIG. 4, the nearest three fuel stations are indicated; however, any predetermined number of nearest fuel stations convenient for the driver to watch in the screen 400 may be displayed from human machine interface design viewpoint. In addition to the distances from the current vehicle position, brand logos and gas prices at the nearest fuel stations may be indicated. Furthermore, it is possible to highlight the cheapest price per gallon to help the driver determine which fuel station to stop at.

Figure 5:
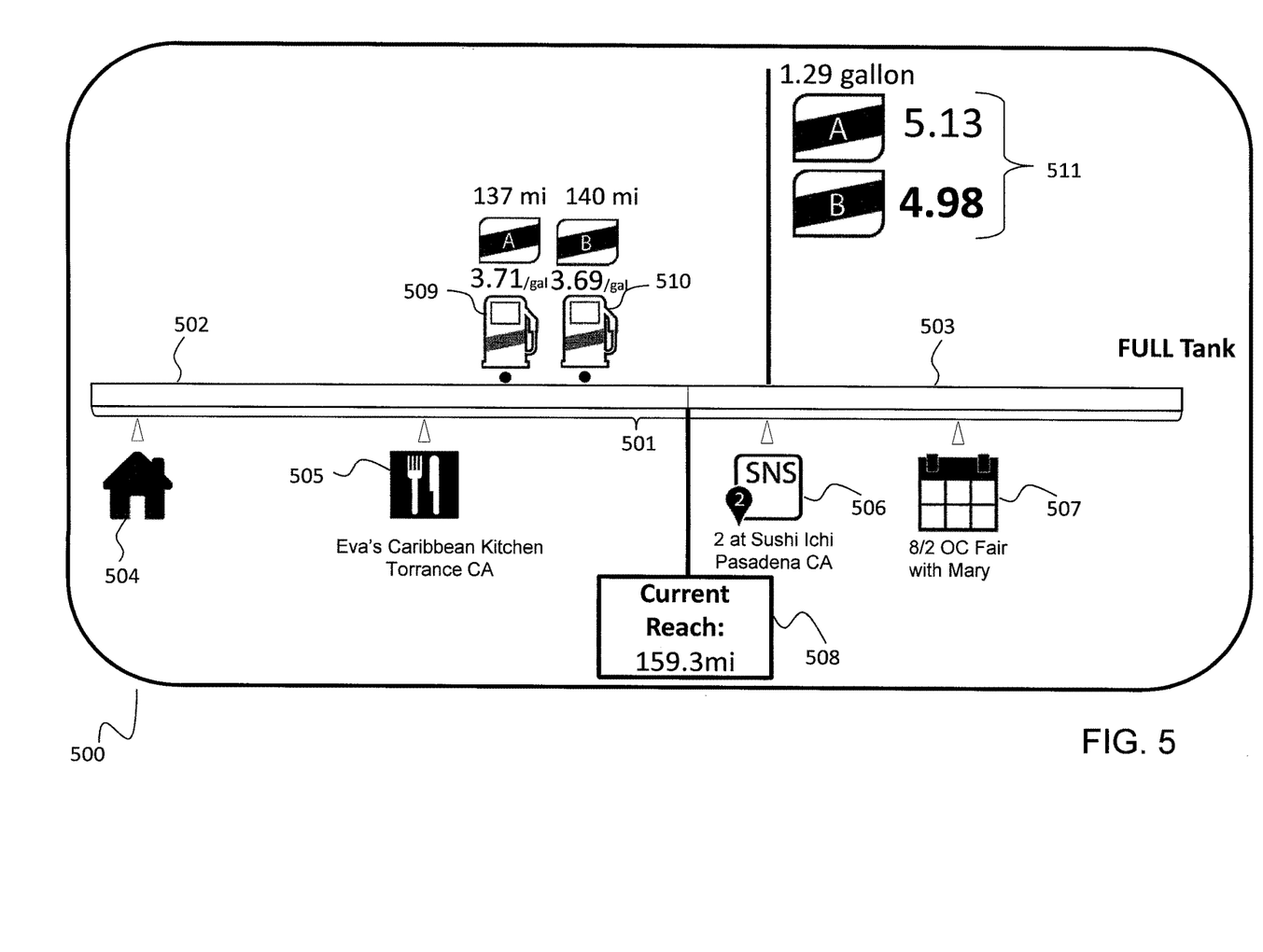
FIG. 5 is a further screen sample of presenting fuel information with route scheduling according to a further embodiment of the disclosure.

In another embodiment, as illustrated in FIG. 5, the screen 500 may indicate farthest fuel stations within a current drivable distance and pieces of fuel station information associated with the farthest fuel stations. The touch screen 500 is displaying a first segment 501 representing full tank capacity information and a drivable distance from a current vehicle position if a tank is full. The first segment 501 includes a second segment 502 representing a current fuel amount and a reachable distance with the current fuel amount from the current vehicle position and a third segment 503 representing a difference between the current fuel amount and the full tank amount as well as driving distances not reachable by the current fuel amount but reachable if the tank is full from the current vehicle position. For example, if a home is near a current vehicle position, a house icon 504 indicating a distance from the current vehicle position and the location of the home can be placed on the second segment 502.

When a POI entry by a driver, SNS information and calendar information of the driver are available, a POI icon 505, an SNS icon 506 and a calendar icon 507 are placed on the first segment 501 based on variety of information as described for FIG. 4. If the estimated results show that the SNS icon 506, and the calendar icon 507 are located in the third segment 503 beyond the currently drivable distance 508 whereas the POI icon 505 is located in the second segment 502 before an estimated maximum drivable distance 508, timing of fueling may be set prior to completely consuming the fuel. Thus, the farthest fuel stations 509 and 510 before reaching the drivable distance 508 may be indicated.

In the screen example of FIG. 5, information on additional fuel 511 such as a fuel amount and its cost estimated to incur at each station 509 and 510, in addition to the current fuel amount, i.e., the second segment 502, to reach the first point indicated by the SNS icon 506, can be indicated in order to assist the driver to determine which fuel station to stop based on estimated fuel amount and cost. In addition, by indicating the POI icon 505 as stated above, the driver is able to understand that the driver does not need to stop at a fuel station before reaching the POI represented by the POI icon 505 because the vehicle still contains a sufficient amount of fuel to reach the farthest fuel stations 509 and 510 without running out of the fuel.

Figure 6:
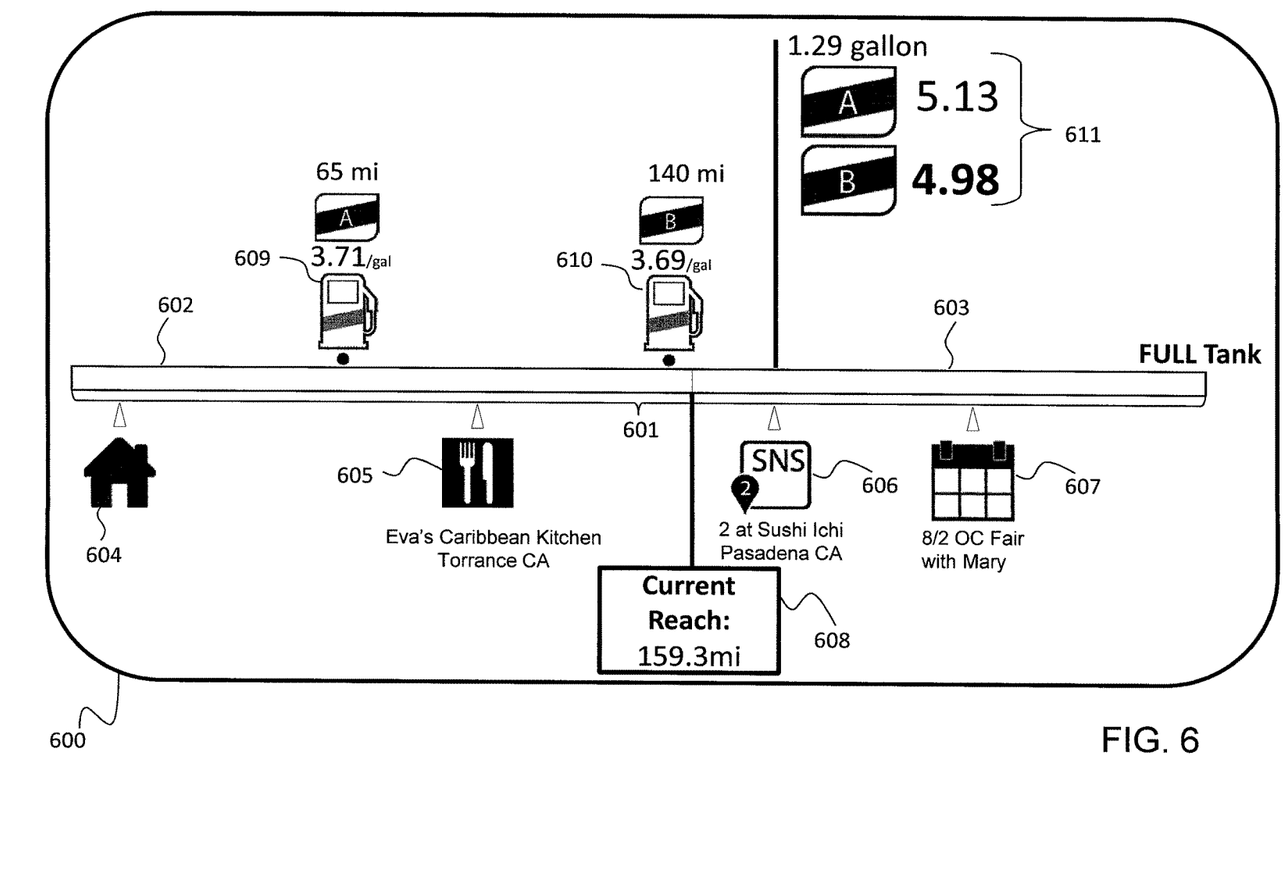
FIG. 6 is a further screen sample of presenting fuel information with route scheduling according to a further embodiment of the disclosure.

In another embodiment, as illustrated in FIG. 6, the screen 600 may indicate fuel stations with lowest fuel prices within a drivable distance with a current fuel amount and pieces of fuel station information associated with the fuel stations with cheapest fuel prices. The touch screen 600 is displaying a first segment 601 representing full tank capacity information and a reachable distance from a current vehicle position if a tank is full. The first segment 601 includes a second segment 602 representing a current fuel amount and a reachable distance 608 with the current fuel amount from the current vehicle position and a third segment 603 representing a difference between the current fuel amount and the full tank amount as well as driving distances not reachable by the current fuel amount but reachable if the tank is full from the current vehicle position. For example, if a home is near a current vehicle position, a house icon 604 indicating a distance from the current vehicle position and the location of the home can be placed on the second segment 602.

When a POI entry by a driver, SNS information and calendar information of the driver are available, a POI icon 605, an SNS icon 606 and a calendar icon 607 are placed on the first segment 601 based on various kinds of information as described for FIG. 4. Here, if the driver wishes to know fuel stations along the calculated routes with lowest fuel prices reachable before completely consuming the remaining fuel, the navigation system obtains fuel station information possibly displayed on the second segment 602 and sorting them by fuel prices. Thus, the fuel stations 609 and 610 along the calculated routes with lowest fuel prices reachable before completely consuming remaining fuel can be displayed with associated pieces of fuel station information on the second segment 602.

Additionally, as shown in the screen example of FIG. 6, additional fuel related information 611 such as a required fuel amount to reach the first point indicated by the SNS icon 606 after reaching the drivable distance 608, and fuel costs for the required fuel amount by using the fuel stations 609 and 610 can be indicated in order to assist the driver to determine which fuel station the driver plans to stop. Further, the lowest fuel price can be highlighted as shown in the fuel information 611. In this example, by displaying the two fuel stations, the first fuel station icon 609 on the left side of the POI icon 605 and the second station icon 610 on the right side of the POI icon 605 just before reaching the drivable distance 608, the driver is able to decide which fuel station to obtain substantially lower price.

If the driver is willing to take a risk, the driver may wish to fill-in the gas at the second fuel station represented by the second fuel station icon 610 just before running out the fuel. Alternatively, if the driver wishes to securely fuel while seeking low fuel cost, the driver is able to choose the first fuel station represented by the first fuel station icon 609 for fueling before going to the POI represented by the POI icon 605. By displaying fuel station options with future driving plan, it is possible for the driver to flexibly plan achieving a suitable fuel cost and timing according to times and locations of future events.

Figure 7:
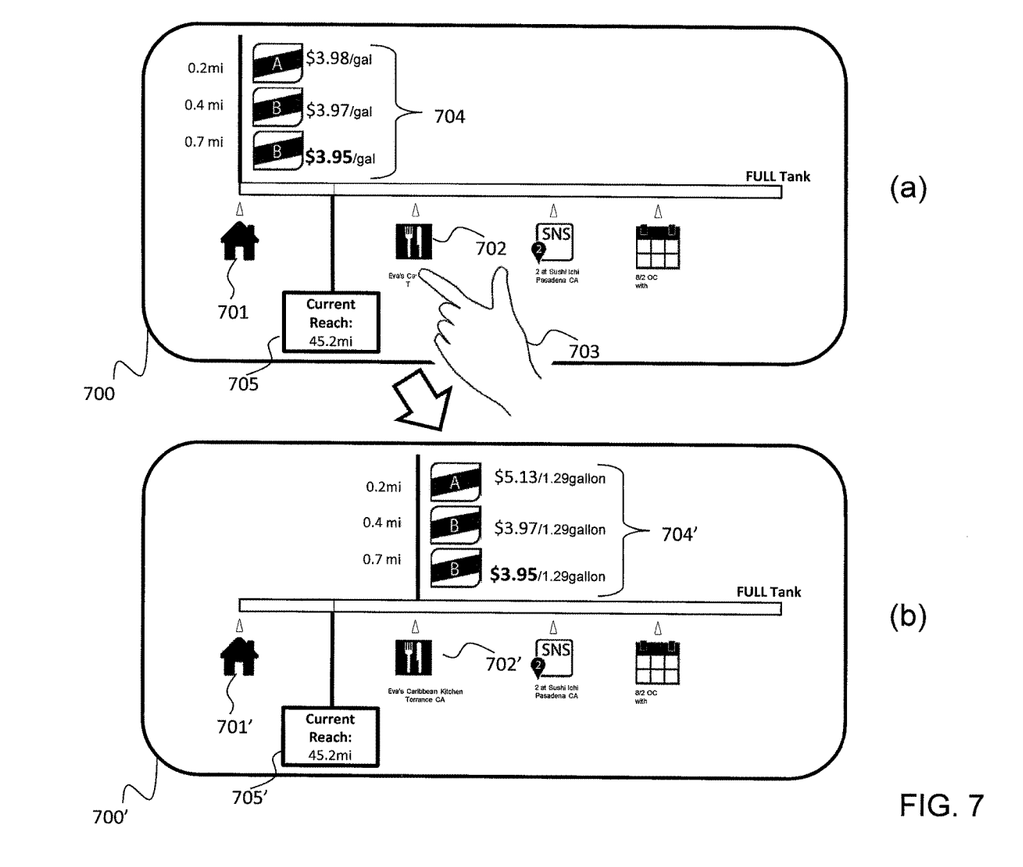

In another embodiment, as illustrated in FIGS. 7(*a*) and 7(*b*), a screen 700 may indicate fuel stations with price, distance and brand information 704 with nearest distances from the current vehicle position, whereas the screen 700' may display the fuel stations with price, distance and brand information 704', if a point is selected by the driver. In this screen sample of FIG. 7(*a*), a pointer of the user is a hand 703; however, any pointer may be sufficient for this functionality. When the hand 703 contacts the screen 700 at the point where a POI icon 702 is displayed, a navigation system calculates a driving distance from a point reachable with the current fuel amount 705' to a POI represented by the POI icon 702' as shown on the screen 700' in FIG. 7(*b*). Here, the same nearest fuel stations with fuel information 704' such as fuel prices corresponding with the fuel amount to drive the distance from the point reachable with the current fuel amount 705' to the POI represented by the POI icon 702' may be indicated in proximity to the POI icon 702', together with distances from the current vehicle position and brand information.

A distance a vehicle can travel with the remaining fuel can be better presented using personal POIs and landmarks. In one embodiment, as illustrated in FIGS. 8(a) and 8(b), a screen 800 may indicate fuel stations with price, distance and brand information with nearest distances from the current vehicle position together with points in a future travel plan and a drivable distance 802 calculated based on the current fuel level information, the fuel economy information and a reference point, such as a current vehicle position, a home, a work, etc., along a segment 805.

Figure 8:
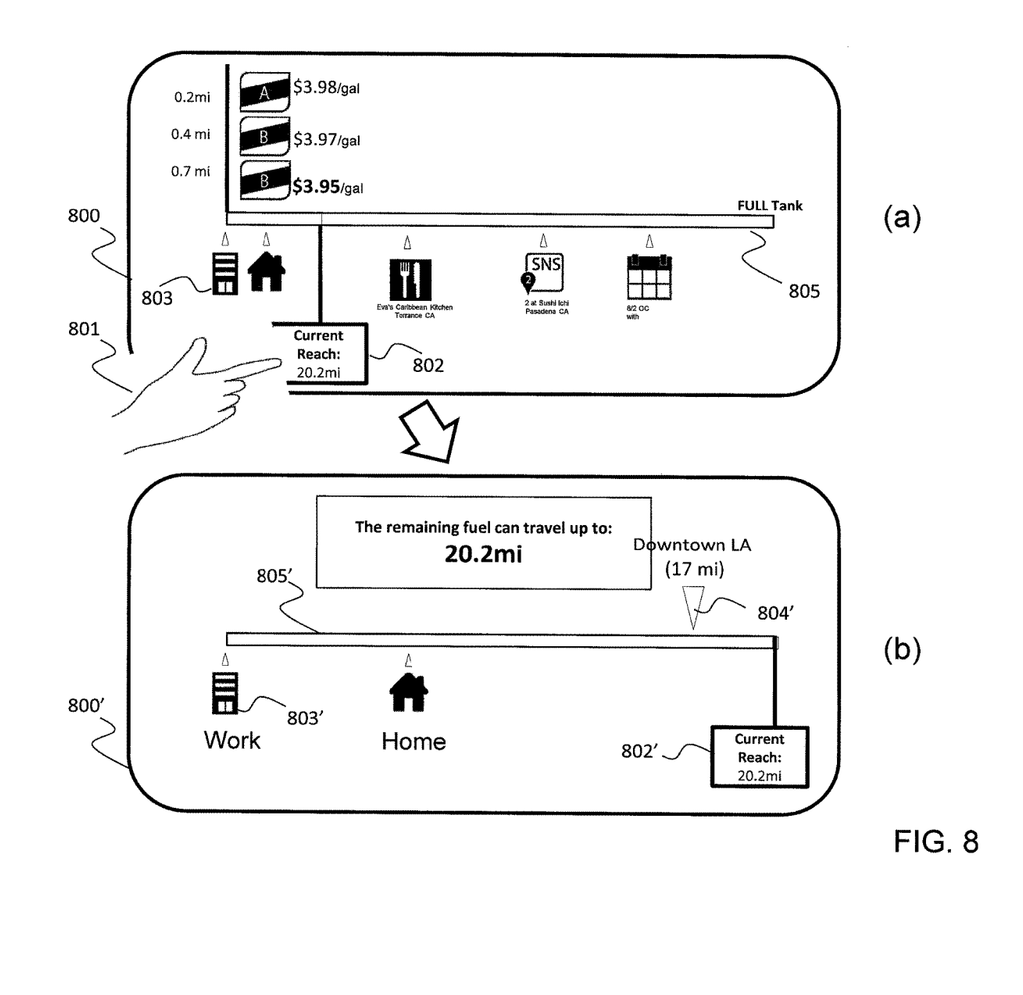

In this screen sample of FIG. 8(a), a pointer of a driver is a hand 801; however, any pointer may be sufficient for this functionality. When the hand 801 contacts the screen 800 at the point where an icon for the drivable distance from the current vehicle position 802 is displayed, a navigation system searches one or more landmarks approximately at the same distance as the drivable distance reachable with the current fuel amount from the reference point. In another screen sample 800' of FIG. 8(b), the reference point 803' is "Work" and the landmark 804' indicates Downtown LA which is 17 miles away from the reference point 803' and within the drivable distance 802' which is 20.2 miles away from the reference point 803'. By displaying the reference point 803' and the landmark 804' along a segment 805', possibly with other points included in the future travel plan within the drivable distance, the driver is able to quickly conceive an idea of the distance he/she can travel and to decide whether it is necessary to fuel in the near future.

Figure 9:
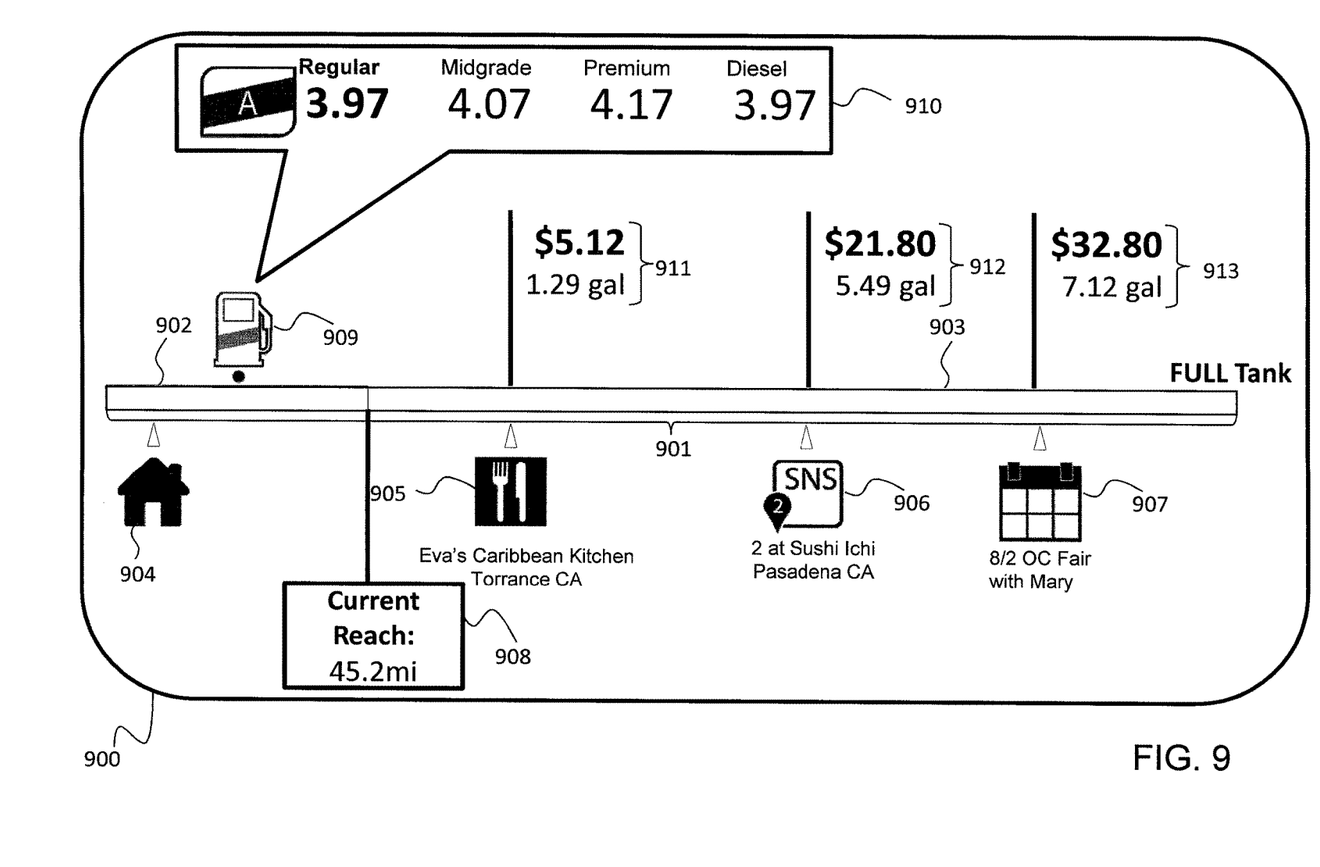
FIG. 9 is a screen sample of presenting fuel information with route scheduling according to a further embodiment.

In another embodiment shown in FIG. 9, a screen 900 may display a nearest fuel station 909 from a current vehicle position with pieces of fuel station information associated with the nearest fuel station, such as price, distance and brand information. The screen 900 is displaying a first segment 901 representing full tank capacity information and a driving distance from a current vehicle position if a tank is full. The first segment 901 includes a second segment 902 representing a current fuel amount and a reachable distance with the current fuel amount from the current vehicle position and a third segment 903 representing a difference between the current fuel amount and the full tank amount as well as driving distances not reachable with the current fuel amount but reachable if the tank is full from the current vehicle position. For example, if a current vehicle position is near home and within the currently reachable distance, a house icon 904 indicating the location of the home can be placed at a proportionately correct distance away from the current vehicle position on the second segment 902.

When a POI entry by a driver, SNS information and calendar information of the driver are available, a POI icon 905, an SNS icon 906 and a calendar icon 907 may be placed on the first segment 901 based on variety of information as described for FIG. 4. If the estimated results show that the POI icon 905, the SNS icon 906, and the calendar icon 907 are located in the third segment 903 beyond the drivable distance reachable by the current fuel amount 908, a driver may wish to fuel at the nearest fuel station 909.

In FIG. 9, the nearest three points 911, 912, and 913 corresponding to the POI icon 905, the SNS icon 906, and the calendar icon 907, respectively, are displayed together with the fuel station information 910 of the nearest fuel station 909, including brand logos of the nearest fuel stations and prices per gallon. For the three interested points 905, 906 and 907, fuel amounts to reach these points and their corresponding fuel costs by using the nearest fuel station can be displayed as three fuel and cost information sets, 911, 912 and 913, respectively. By displaying the fuel information to reach the points based on the future driving plan, the driver may be able to determine a fuel amount to be fed at the nearest fuel station 909.

Figure 10:
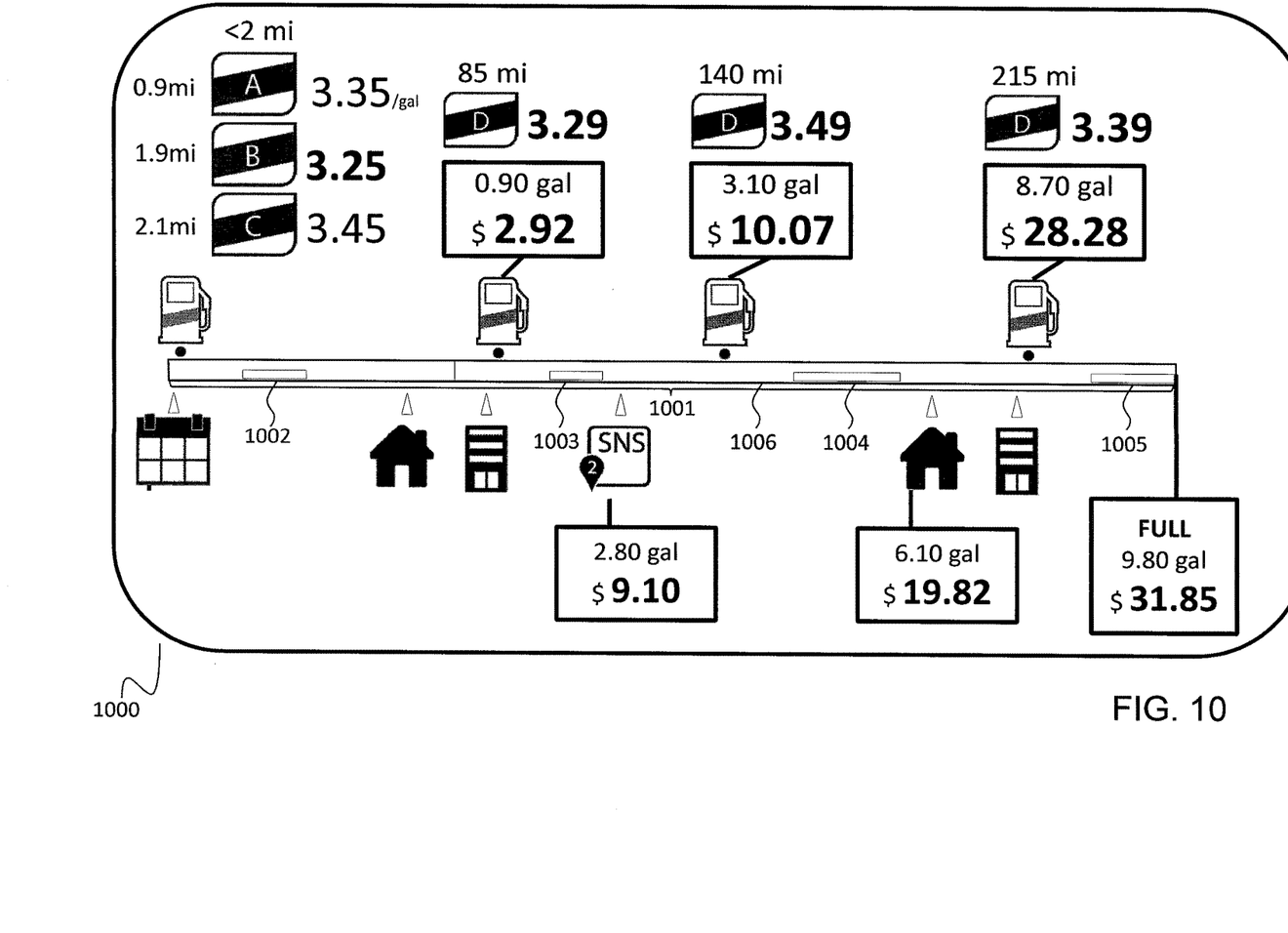
FIG. 10 is a screen sample of presenting fuel information with route scheduling according to a further embodiment.

FIG. 10 illustrates another embodiment, where a screen 1000 displays the above pieces of fuel information and point information along the segment including one or more segments on a motorway where a vehicle is prohibited to have access to any fuel station. As mentioned earlier, in a map database with a layered structure, the higher layer represents only high class roads equivalent of motorways, for example, interstate highway, freeway, etc. with road links (road segments) of relatively large length and covers the wider area. Segments 1002, 1003, 1004, and 1005 in FIG. 10 are such motorway segments indicated in a total segment 1001, i.e., a motorway 1006. Here, the motorway segments are displayed in a special color, but it is possible to display the motorway segments 1002, 1003, 1004, and 1005 with different background patterns than the motorway 1006. From this, it is easy for a driver to understand where he/she may not have access to fuel stations on these motorway segments and how soon or late the driver needs to fuel the vehicle, avoiding to get stuck in the middle of the motorway.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that, various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of displaying fuel information for a vehicle, comprising:
    obtaining fuel tank capacity information of the vehicle;
    obtaining current fuel level information of the vehicle;
    obtaining fuel economy information of the vehicle;
    obtaining point information of one or more points, each point information of each point comprising location information;
    measuring, by a position measuring device which includes a GPS (Global Positioning System) receiver, a current vehicle position based on GPS signals;
    calculating routes to the one or more points based on location information of the one or more points and the current vehicle position;
    estimating first fuel amounts for reaching the one or more points based on the calculated routes, fuel economy information;
    selecting one or more fuel stations within a predetermined range of the calculated routes based on location information of the one or more fuel stations;
    estimating second fuel amounts for reaching at the one or more fuel stations based on the obtained locations of the fuel stations, the fuel economy information and the current vehicle position;
    obtaining fuel price information of the one or more fuel stations from a network; and displaying, on a display screen, the point information, the locations of the fuel stations, the fuel price information, the fuel tank capacity information and the current fuel level information along one or more segments of parameter.

2. The method of displaying fuel information for the vehicle of claim 1,
wherein the selected one or more fuel stations are the nearest one or more fuel stations from the current vehicle position.

3. The method of displaying fuel information for the vehicle of claim 1, further comprising:
computing a drivable distance based on the current fuel level information and the fuel economy information;
wherein the selected one or more fuel stations are the farthest one or more fuel stations within the drivable distance from the current vehicle position.

4. The method of displaying fuel information for the vehicle of claim 1, further comprising:
computing a drivable distance based on the current fuel level information and the fuel economy information;
wherein the selected one or more fuel stations have substantially lowest fuel prices within the drivable distance from the current vehicle position.

5. The method of displaying fuel information for the vehicle of claim 1, further comprising:
allowing a user to select at least one of a point among the one or more points and a fuel station among the one or more fuel stations;
displaying at least one of fuel price or amount of fuel to be fed at the selected fuel station if the fuel station is selected; and
displaying at least one of fuel price or amount of fuel to be fed for reaching to the selected point, if the point is selected.

6. The method of displaying fuel information for the vehicle of claim 1, further comprising:
computing a drivable distance based on the current fuel level information, the fuel economy information and a reference point;
searching a landmark within the driving distance from a reference point; and
displaying the reference point, the drivable distance and the landmark along the segment.

7. The method of displaying fuel information for the vehicle of claim 1, further comprising:
displaying at least one of fuel price or amount of fuel to be fed at a nearest fuel station for reaching to the one or more points from the nearest fuel station.

8. The method of displaying fuel information for the vehicle of claim 1,
wherein obtaining the point information of the one or more points is executed by accessing one of user entries, search results of Points of Interest, driving history including visited points, location information obtained from social media, near future events in a calendar of a user in the vehicle, an address book of the user, and contexts of communications related to the user in the vehicle.

9. The method of displaying fuel information for the vehicle of claim 1, further comprising:
displaying logos associated with brands of the fuel stations with the locations of the fuel stations along the segment, respectively.

10. The method of displaying fuel information for the vehicle of claim 1, further comprising:
displaying a whole or part of the segment indicating a whole or partial route corresponding to a motorway in a distinctive manner.

11. A system of route scheduling for a vehicle, comprising:
a processor;
one or more sensors configured to sense drive related information;
a memory comprising a map database;
a screen; and
a vehicle interface configured to receive vehicle related drive information and fuel information from the vehicle;
wherein the fuel information regarding the vehicle comprises:
fuel tank capacity information of the vehicle current fuel level information of the vehicle; and
fuel economy information of the vehicle;
and wherein the processor is configured to obtain point information of one or more points, each point information of each point comprising location information, to calculate routes to the one or more points based on location information of the one or more points and a current vehicle position based on the drive related information of the one or more sensors, to estimate first fuel amounts for reaching the one or more points based on the calculated routes and the fuel economy information, to select one or more fuel stations within a predetermined range of the calculated routes based on location information of the one or more fuel stations, to estimate second fuel amounts for reaching at the one or more fuel stations based on the obtained locations of the fuel stations, the fuel economy information and the current vehicle position, to obtain fuel price information of the one or more fuel stations from a network, and to instruct the screen to display the fuel price information, the point information, the locations of the fuel stations, the fuel tank capacity information and the current fuel level information along with one or more segments of parameter.

12. The system of route scheduling for the vehicle of claim 11,
wherein the selected one or more fuel stations are the nearest one or more fuel stations from the current vehicle position.

13. The system of route scheduling for the vehicle of claim 11,
wherein the processor is configured to compute a drivable distance based on the current fuel level information and the fuel economy information; and
wherein the selected one or more fuel stations are the farthest one or more fuel stations within the drivable distance from the current vehicle position.

14. The system of route scheduling for the vehicle of claim 11,
wherein the processor is configured to compute a drivable distance based on the current fuel level information and the fuel economy information; and
wherein the selected one or more fuel stations have substantially lowest fuel prices within the drivable distance from the current vehicle position.

15. The system of route scheduling for the vehicle of claim 11, further comprising:
wherein the processor is configured to instruct a screen to display at least one of point information of the one or more points or fuel station information of the one or more fuel stations, to allow a user to select at least one point among the one or more points and a fuel station among the one or more fuel stations, to instruct the screen to display at least one of fuel price or amount of fuel to be fed at the selected fuel station if the fuel station is selected, and to instruct the screen to display at least one of fuel price or amount of fuel to be fed for reaching to the selected point, if the point is selected.

16. The system of route scheduling for the vehicle of claim 11,
wherein the processor is configured to compute a drivable distance based on the current fuel level information, the fuel economy information and a reference point;
wherein the processor is configured to compute search a landmark within the drivable distance from a reference point by using the map database; and
wherein the processor is configured to instruct the screen to display the reference point, the drivable distance and the landmark along with the line on the screen.

17. The system of route scheduling for the vehicle of claim 11,
wherein the processor is configured to instruct the screen to display at least one of fuel price or amount of fuel to be fed at a nearest fuel station for reaching to the one or more points from the nearest fuel station.

18. The system of route scheduling for the vehicle of claim 11,
wherein the processor is configured to obtain the point information of the one or more points by accessing at least one of user entries, search results of Points of Interest, driving history including visited points, location information obtained from social media, near future events in a calendar of a user in the vehicle, and contexts of communications related to the user in the vehicle.

19. The system of route scheduling for the vehicle of claim 11,
wherein the processor is configured to instruct the screen to display logos associated with brands of the fuel stations with the locations of the fuel stations along the segment, respectively.

20. The system of route scheduling for the vehicle of claim 11,
wherein the processor is configured to instruct the screen to display a whole or part of the segment indicating a whole or partial route corresponding to a motorway in a distinctive manner.

* * * * *